No. 683,287. Patented Sept. 24, 1901.
A. H. HUTCHINSON.
PIPE COUPLING.
(Application filed July 24, 1901.)

(No Model.)

Witnesses
Chas. K. Davies.

Inventor
Arthur H. Hutchinson,
by E. W. Bradford
Attorney

UNITED STATES PATENT OFFICE.

ARTHUR H. HUTCHINSON, OF WAYNESBORO, PENNSYLVANIA, ASSIGNOR TO FRICK COMPANY, OF SAME PLACE.

PIPE-COUPLING.

SPECIFICATION forming part of Letters Patent No. 683,287, dated September 24, 1901.

Application filed July 24, 1901. Serial No. 69,469. (No model.)

*To all whom it may concern:*

Be it known that I, ARTHUR H. HUTCHINSON, a citizen of the United States, residing at Waynesboro, in the county of Franklin and State of Pennsylvania, have invented certain new and useful Improvements in Pipe-Couplings, of which the following is a specification.

My said invention consists in an improved construction of pipe-coupling especially designed for use in forming the return-bends in coils of pipe, such as are used in ice-making and refrigerating machinery, but adapted for many other applications, whereby the joint is made very secure at comparatively small cost, the parts adapted for convenient and quick assembling and disassembling, and no cut portion of the pipe is left exposed to the action of chemical or other agents with which the pipes may be used, all as will be hereinafter more fully described and claimed.

Figure 1:
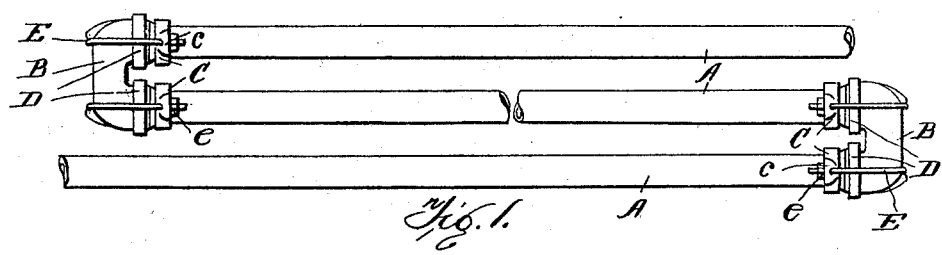
Figure 2:
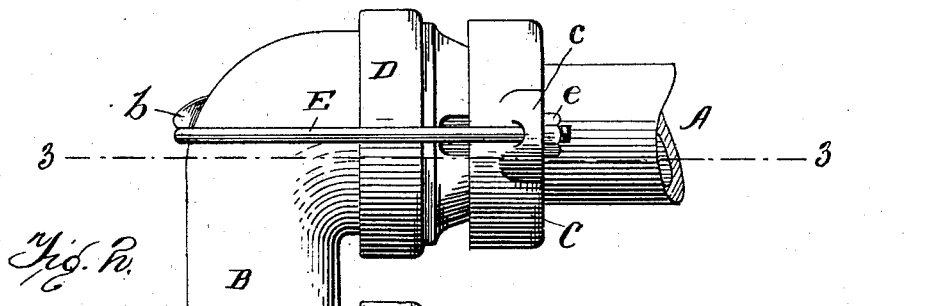
Figure 4:
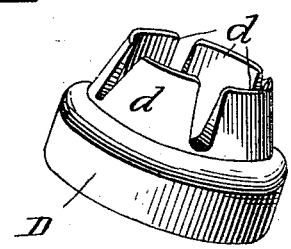
Figure 3:
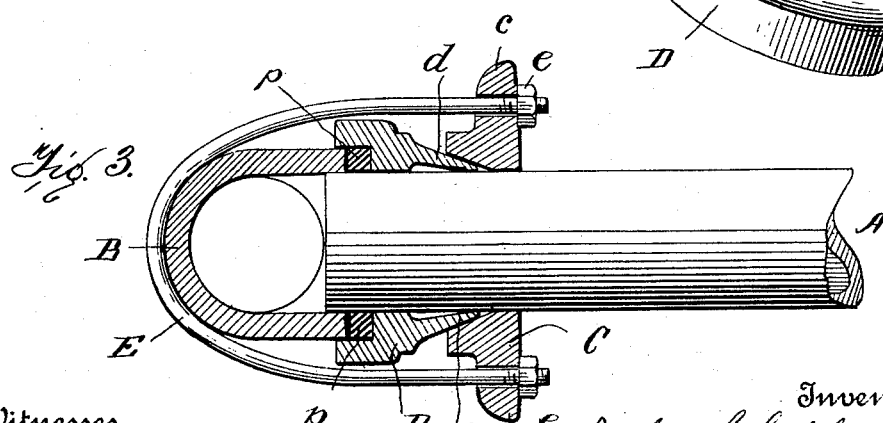

Referring to accompanying drawings, which are made a part hereof, and on which similar letters of reference indicate similar parts, Figure 1 is a view of a section of a pipe-coil the return-bends of which are made with my improved coupling; Fig. 2, a view, on an enlarged scale, of the bend or coupling; Fig. 3, a transverse section through one side of the same on the dotted line 3 3, and Fig. 4 a perspective view of the clamping-ring or stuffing-box.

In said drawings the portions marked A represent the pipes; B, the return-bend; C, a sliding gland or clamp; D, the clamping-ring or stuffing-box, and E U-shaped clamping-bolts. The pipes A and return-bends B are or may be of any usual or approved form, except that they are not screw-threaded, the pipe being slid freely the proper distance into the opening provided therefor in said bend. The gland C is provided with a central opening adapted to slide onto the pipe freely, being preferably tapered outwardly toward the outer end. It has projections $c$ on its opposite sides, with perforations through which the ends of the U-shaped bolts extend. The clamp stuffing-box D is a ring adapted to seat on the edge or flange around the top of the opening in each side of the bend B, its lower end being counterbored to receive a packing-ring $p$, of rubber other suitable material, and the end of said flange, which projects into said parts D, as shown in Fig. 2. Extending out from said ring are clamping wings or flanges $d$, made, preferably, by being cast in the form shown; but, as will be readily understood, they may be formed by suitable cuts with a saw through an annular flange of proper form cast on the ring D. They are of metal that will yield slightly and are tapered on the outside to correspond substantially with the taper of the opening in gland C. They may also be tapered on the under side, if preferred, as shown in Fig. 3, and thus rendered more yielding; but this is not necessary. The U-bolts E embrace the outer end of the bend B at each side at a point in line with the center of pipes A, and their ends project through the perforations in projections $c$ on the sides of glands C, as before described, and have nuts $e$ on their outer ends by which the parts may be tightly drawn together. The U-bolts are held in place on the bend B by ears or projections $b$, cast thereon at proper points. Instead of the U-bolts common bolts may be used, if preferred, as will be readily understood.

The parts are assembled as follows: The gland C is first slipped onto the end of the pipe, and then the clamp stuffing-box D, with the packing-ring $p$ in place. The pipe is then inserted into its side of the bend B, the bolt E put in place, and the nuts $e$ thereon drawn down tightly. This serves to force the gland C and part D downward, compressing the packing-ring $p$ and forming a tight joint between the pipe and bend. At the same time the points or clamping-wings $d$ are forced against the sides of pipe A, so as to firmly clamp it to said bend through said bolts and gland. By this means the parts are quickly fitted and safely secured, the ready assembling and disassembling is made possible, and an inexpensive joint provided which will remain tight regardless of the contraction and expansion of the pipe, as the packing-ring will contract and expand with it, and one which will tighten and hold with increased power as the pressure in the pipes increases.

Having thus fully described my said invention, what I claim as new, and desire to secure by Letters Patent, is—

1. In a pipe-coupling, the combination of the two parts to be coupled a gland with tapered opening surrounding one, a stuffing-box with compressible wings or flanges within said tapered opening and provided with a packing-ring in a counterbored seat on its opposite end, which end fits over the end of the other part, with the packing-ring seated against it, and clamping-bolts connected with the last-mentioned part and extending through the gland and provided with nuts, whereby the several parts may be securely clamped together, substantially as set forth.

2. In a pipe-coupling, the combination, of the two pipes, or parts to be coupled, the clamping part with spring or compressible portions engaging with one part and seated against the other a packing-ring being interposed between them and said clamping part having a flange which extends down around said packing-ring and the end of the other part, and means for drawing said parts together, substantially as set forth.

3. In a pipe-coupling, the combination of the pipe A, the return-bend B with openings adapted to receive the end of said pipe, the gland C with tapered central opening, the clamp stuffing-box D with projecting parts $d$ and formed with a recess in its under side containing the packing-ring and the U-bolts E engaging the bend B and projecting through the gland C and provided with the nuts $e$, all substantially as described and for the purpose specified.

4. In a pipe-coupling the combination of the two sections of pipe, a gland with tapered opening surrounding each pipe, a stuffing-box with compressible fingers or flanges within said tapered opening provided with a packing-ring in counterbored seat on its opposite end, which end fits over the end of bend or other fitting, with the packing-ring seated against it and clamping-bolts connected with the bend or fitting, and extending through the gland and provided with nuts whereby the several parts may be securely clamped together substantially as set forth.

In witness whereof I have hereunto set my hand and seal, at Waynesboro, Pennsylvania, this 8th day of July, A. D. 1901.

ARTHUR H. HUTCHINSON. [L. S.]

Witnesses:
A. O. FRICK,
ALF. N. RUSSELL.